US012121851B1

(12) United States Patent
AlShehry et al.

(10) Patent No.: US 12,121,851 B1
(45) Date of Patent: Oct. 22, 2024

(54) WELLHEAD CARBON CAPTURE, UTILIZATION, AND STORAGE USING MIXED MATRIX MEMBRANES

(71) Applicant: Saudi Arabian Oil Company, Dhahran (SA)

(72) Inventors: Ghassan Salem AlShehry, Dammam (SA); Hassan Sakar Alqahtani, Dammam (SA); Khalid Mohammed M. Alruwaili, Dammam (SA); Vera Solovyeva, Moscow (RU); Justin Tate Abel, Austin, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/638,509

(22) Filed: Apr. 17, 2024

(51) Int. Cl.
| | |
|---|---|
| *B01D 53/22* | (2006.01) |
| *B01D 53/62* | (2006.01) |
| *B01D 69/14* | (2006.01) |
| *B01D 71/76* | (2006.01) |
| *E21B 43/26* | (2006.01) |
| *E21B 41/00* | (2006.01) |
| *E21B 43/267* | (2006.01) |

(52) U.S. Cl.
CPC .......... *B01D 53/228* (2013.01); *B01D 69/14* (2013.01); *B01D 71/76* (2013.01); *E21B 43/2605* (2020.05); *B01D 2257/504* (2013.01); *E21B 41/0064* (2013.01); *E21B 43/267* (2013.01)

(58) Field of Classification Search
CPC .... B01D 53/22; B01D 53/221; B01D 53/228; B01D 69/14; B01D 71/76; B01D 2257/504; E21B 43/2605; E21B 43/267; E21B 41/0064

USPC ..................................................... 95/51; 96/4
See application file for complete search history.

(56) References Cited

U.S. PATENT DOCUMENTS

| | | |
|---|---|---|
| 7,485,173 B1 | 2/2009 | Liu et al. |
| 8,132,678 B2 | 3/2012 | Liu et al. |
| (Continued) | | |

FOREIGN PATENT DOCUMENTS

| | | |
|---|---|---|
| AU | 2013353326 | 7/2017 |
| CA | 2551497 | 2/2013 |
| (Continued) | | |

OTHER PUBLICATIONS

U.S. Appl. No. 18/638,505, Solovyeva et al., filed Apr. 17, 2024.
(Continued)

*Primary Examiner* — Frank M Lawrence, Jr.
(74) *Attorney, Agent, or Firm* — Fish & Richardson P.C.

(57) ABSTRACT

A system for carbon dioxide ($CO_2$) capture at a wellhead using a mixed matrix membranes (MMM). The MMM includes a polymer matrix and covalent triazine framework (CTF) fillers. The captured $CO_2$ stream may be reutilized through sequestration and utilization approaches. The bulk stream may be split into multiple streams for various applications. Some $CO_2$ may be converted chemically into fuels, reaction intermediates, and productivity enhancement tools such as methanol, syngas, $CO_2$-foam, used in fracking fluids, and stimulant acids. The rest may be stored through direct injection into porous formations or reactive rocks such as basalt.

20 Claims, 3 Drawing Sheets

(56) References Cited

U.S. PATENT DOCUMENTS

| | | | |
|---|---|---|---|
| 8,678,203 | B2 | 3/2014 | Knapp et al. |
| 10,188,981 | B2 | 1/2019 | Al-Maythalony et al. |
| 2002/0189445 | A1* | 12/2002 | Miller ............... B01D 63/02 95/51 |
| 2016/0279561 | A1* | 9/2016 | Burgers ............. B01D 53/226 |
| 2021/0016245 | A1 | 1/2021 | Pahwa et al. |
| 2021/0331122 | A1 | 10/2021 | Li-Oakey et al. |
| 2022/0145008 | A1* | 5/2022 | Yang ................. B01D 71/32 |
| 2023/0160293 | A1* | 5/2023 | Nguyen ............. E21B 43/34 166/244.1 |

FOREIGN PATENT DOCUMENTS

| | | |
|---|---|---|
| CA | 2551499 | 4/2013 |
| CN | 111701458 | 9/2020 |
| KR | 102029451 | 10/2019 |
| RU | 2522555 | 7/2014 |
| RU | 2634724 | 11/2017 |
| WO | WO 2015129925 | 9/2015 |
| WO | WO 2023007201 | 2/2023 |

OTHER PUBLICATIONS

Alentiev et al., "Polynorbornenes bearing ether fragments in substituents: Promising membrane materials with enhanced CO2 permeability," Journal of Membrane Science, Apr. 15, 2022, 648: 1-15, 15 pages.

Allan et al., "Energy Transition: Optimizing Existing E&P Value and Clean Energy Potential," Presented at the SPE Annual Technical Conference and Exhibition, Dubai, UAE, Sep. 2021, 17 pages.

Azhari et al., "Methanol synthesis from $CO_2$: A mechanistic overview," Results in Engineering, Dec. 2022, 16(100711):1-19, 19 pages.

Bahmanpour et al., "Recent progress in syngas production via catalytic $CO_2$ hydrogenation reaction," Applied Catalysis B: Environmental, Oct. 15, 2021, 295(120319):1-11, 11 pages.

Bugel et al., "Biphenyl-based covalent triazine framework/ matrimid® mixed-matrix membranes for CO2/CH4 separation," Membranes, Oct. 19, 2021, 11(795):1-11, 11 pages.

Bugel et al., "Covalent triazine framework CTF-fluorene as porous filler material in mixed matrix membranes for CO2/CH4 separation," Microporous and Mesoporous Materials, Mar. 2021, 316(110941):1-8, 8 pages.

Buyukcakir et al., "Charged Covalent Triazine Frameworks for CO2 Capture and Conversion," ACS Applied Materials & Interfaces, Feb. 8, 2017, 9(8):7209-7216, 8 pages.

Cao et al., "Reactive Transport Modeling of Anthropogenic Carbon Mineralization in Stacked Columbia River Basalt Reservoirs," Presented at the SPE/AAPG/SEG Unconventional Resources Technology Conference, Denver, Colorado, USA, Jun. 2023, 8 pages.

Chan et al., "$CO_2$ Removal from Natural Gas Using Membrane Contactor," Prepared for presentation at the Offshore Technology Conference Asia held in Kuala Lumpur, Malaysia, Mar. 25-28, 2014, 7 pages.

Dey et al., "Synthesis and Characterization of Covalent Triazine Framework CTF- @Polysulfone Mixed Matrix Membranes and Their Gas Separation Studies," Front. Chem., Oct. 23, 2019, 7(693):1-8, 8 pages.

Dujardin et al., "Polyvinylnorbornene Gas Separation Membranes," Polymers, Apr. 17, 2019, 11(704):1-15, 15 pages.

Finkelshtein et al., "Substituted polynorbornenes as promising materials for gas separation membranes," Russian Chemical Reviews, 2011, 80(4):341-361, 21 pages.

Fu et al., "Functionalized Covalent Triazine Frameworks for Effective CO2 and SO2 Removal," ACS Appl. Mater. Interfaces, Oct. 1, 2018, 10(42):36002-36009, 8 pages.

Gmernicki et al., "Accessing Siloxane Functionalized Polynorbornenes via Vinyl-Addition Polymerization for CO2 Separation Membranes," ACS Macro Lett., Jul. 6, 2016, 5(7):879-883, 5 pages.

Guseva et al., "Polymers based on exo-silicon-substituted norbornenes for membrane gas separation," Journal of Membrane Science, Nov. 15, 2021, 638(119656):1-15, 15 pages.

Hillock et al., "Crosslinked mixed matrix membranes for the purification of natural gas: Effects of sieve surface modification," Journal of Membrane Science, Apr. 30, 2008, 314(1-2):193-199, 7 pages.

iea.blob.core.windows.net [online], "Emissions from Oil and Gas Operations in Net Zero Transitions—A World Energy Outlook Special Report on the Oil and Gas Industry and COP28," Jun. 2023, retrieved on May 20, 2024, retrieved from URL <https://iea.blob.core.windows.net/assets/2f65984e-73ee-40ba-a4d5-bb2e2c94cecb/EmissionsfromOilandGasOperationinNetZeroTransitions.pdf>, 33 pages.

Jiang et al., "Mixed-Matrix Membranes with Covalent Triazine Framework Fillers in Polymers of Intrinsic Microporosity for CO2 Separations," Ind. Eng. Chem. Res., Oct. 31, 2019, 59(12):5296-5306, 11 pages.

Liang et al., "Green synthesis of graphite from $CO_2$ without graphitization process of amorphous carbon," Nature Communications, Jan. 5, 2021, 12(119):1-9, 9 pages.

Liao et al., "Advances in the Synthesis of Covalent Triazine Frameworks," ACS Omega, Jan. 23, 2023, 8(5):4527-4542, 16 pages.

Liu et al., "Origin and evolution of a $CO_2$-Rich gas reservoir offshore Angola: Insights from the Gas Composition and isotope analysis," Applied Geochemistry, Jan. 2023, 148(105552):1-10, 10 pages.

Middleton et al., "$CO_2$ as a fracturing fluid: Potential for commercial-scale shale gas production and $CO_2$ sequestration," Energy Procedia, 2014, 63:7780-7784, 5 pages.

Mukherjee et al., "Dual Strategic Approach to Prepare Defluorinated Triazole-Embedded Covalent Triazine Frameworks with High Gas Uptake Performance," Chem. Mater., May 22, 2019, 31(11):3929-3940, 12 pages.

Mukhtar et al., "Impact of amine functionality on the selective CO2/CH4 adsorption behavior of porous covalent triazine adsorbent," Journal of Natural Gas Science and Engineering, Nov. 2020, 10 pages.

Mukhtar et al., "Synthesis-structure-property relationship of nitrogen-doped porous covalent triazine frameworks for pre-combustion CO2 capture," Energy, Nov. 5, 2020, 216(119230):1-17, 17 pages.

Muller et al., "Sabatier-based $CO_2$-methanation by catalytic conversion," Environmental Earth Science, Jul. 6, 2013, 70:3771-3778, 8 pages.

Nasr-El-Din et al., "Stimulation of Deep Gas Wells Using HC1/ Formic Acid System: Lab Studies and Field Application," Presented at the Canadian International Petroleum Conference, Calgary, Alberta, Jun. 11, 2002, 22 pages.

Shan et al., "Mixed-matrix membranes containing an azine-linked covalent organic framework: Influence of the polymeric matrix on post-combustion $CO_2$-capture," Journal of Membrane Science, Mar. 1, 2018, 549:377-384, 8 pages.

Snæbjörnsdóttir et al., "Carbon dioxide storage through mineral carbonation," Nature Reviews Earth & Environment, Jan. 20, 2020, 1:90-102, 13 pages.

Thankamony et al., "Porous covalent triazine piperazine polymer (CTPP)/PEBAX mixed matrix membranes for CO2/N2 and CO2/ CH4 separations," Journal of Membrane Science, Dec. 1, 2019, 591(117348):1-8, 8 pages.

Thompson et al., "Mixed-linker zeolitic imidazolate framework mixed-matrix membranes for aggressive CO2 separation from natural gas," Microporous and Mesoporous Materials, Jul. 1, 2014, 192:43-51, 9 pages.

Torres et al., "Comparative analysis of absorption, membrane, and hybrid technologies for $CO_2$ recovery," Journal of Natural Gas Science and Engineering, Oct. 2021, 94(104082):1-8, 8 pages.

Wang et al., "A fluorine-containing hydrophobic covalent triazine framework with excellent selective CO2 capture performance," J. Mater. Chem. A, Mar. 6, 2018, 6:6370-6375, 6 pages.

Wang et al., "Enhanced Separation Performance for $CO_2$ Gas of Mixed-Matrix Membranes Incorporated with $TiO_2$/Graphene Oxide: Synergistic Effect of Graphene Oxide and Small $TiO_2$ Particles on (56) References Cited

OTHER PUBLICATIONS

Gas Permeability of Membranes," Ind. Eng. Chem. Res., Jul. 23, 2017, 56(31):8981-8990, 10 pages.

Wang et al., "Substituted polynorbornene membranes: a modular template for targeted gas separations," Polym. Chem., Apr. 26, 2021, 2:2947-2977, 31 pages.

Wang et al., "Vinyl-Addition Fluoroalkoxysilyl-Substituted Polynorbornene Membranes for CO2/CH4 Separation," ACS Appl. Polym. Mater., Feb. 9, 2022, 4(11):7976-7988, 13 pages.

Zhu et al., "Bipyridinium-Based Ionic Covalent Triazine Frameworks for CO2, SO2, and No. Capture," ACS Appl. Mater. Interfaces, Jan. 27, 2020, 12(7):8614-8621, 8 pages.

\* cited by examiner

WELLHEAD CARBON CAPTURE, UTILIZATION, AND STORAGE USING MIXED MATRIX MEMBRANES

TECHNICAL FIELD

This disclosure relates to a system of carbon dioxide ($CO_2$) capture at the wellhead using mixed matrix membranes (MMM) and a pathway for the utilization and storage of $CO_2$ to minimize $CO_2$ emissions.

BACKGROUND

For the past few decades, carbon emissions have been a major concern. Significant amounts of $CO_2$ are released from oil and gas wells during production. Typically, the collected gas stream is sent to a gas processing plant where non-hydrocarbons, including $CO_2$, are separated from the hydrocarbons before distribution. Higher composition of $CO_2$ in the gas stream causes corrosion of pipelines, as well as a higher cost to reach the current standard for LNG specifications. Therefore, it is necessary to remove $CO_2$ earlier in the process.

SUMMARY

This disclosure describes technologies related to $CO_2$ capture using a mixed matrix membrane, installed at the wellhead and its utilization to achieve a net lower carbon emission. An implementation described herein provides a system for capturing $CO_2$ at the wellhead using a mixed matrix membrane (MMM) that includes a polymer matrix and covalent triazine framework (CTF) fillers. The MMM used is selective to $CO_2$ relative to other gases in a natural gas stream.

DETAILED DESCRIPTION

Conventional $CO_2$ capture technologies such as absorption, adsorption, and cryogenic distillation show high processibility, but suffer from high energy consumption, harmful ecological effects, and high costs. Membrane technology is an alternative way of $CO_2$ capture, which eliminates the above-mentioned disadvantages of traditional techniques.

Efficiency of membrane processes depend on the properties of the membrane material. Polymeric membranes show a high separation performance for gases, which makes them attractive in gas separation applications. However, pure polymers have reached permeability/selectivity trade-off limitation, known as Robeson's upper bound. Hence, there is a necessity for engineering membranes for high throughput gas separation.

In this disclosure, a system for capturing $CO_2$ at the wellhead is described. In various implementations, the system uses a polymer composite material generally referred to as mixed matrix membrane (MMM). A MMM includes a polymer matrix and porous fillers. Appropriate material selection for both polymer matrix and porous fillers is effective for the development of a highly efficient MMM.

In various implementations, the MMM includes polynorbornenes and/or polytricyclononenes as a polymer matrix and a covalent triazine framework (CTF) filler. Substituted polynorbornenes and polytricyclononenes show hydrogen sulfide ($H_2S$)/methane ($CH_4$) and $CO_2/CH_4$ permeability and selectivity, offering benefits for natural gas purification from $CO_2$ and $H_2S$. The use of a specific combination of the polymer matrix and fillers described in this disclosure can help overcome selectivity/permeability trade-off of the most commercially used polymers for membrane fabrication.

In general, covalent triazine frameworks (CTFs) refer to a class of organic polymer materials having aromatic 1,3, 5-triazine rings as their core unit. The chemical structure of CTFs has a wide variety depending on the building blocks that link the triazine rings. CTFs are generally porous, making them a promising candidate for applications in gas adsorption/separation and catalysis, including $CO_2$ membrane separation. Further, CTFs are highly chemically and thermally stable in a broad range of high pressure and high temperature conditions and possess high $CO_2$ capture capacity even at humid conditions. Moreover, their covalent organic chemical nature is compatible with organic polymer matrix and would not cause interfacial defects upon blending with polymers. The integration of nanofillers in polymer matrices allows higher recovery while maintaining the desired purity for the retentate and permeate streams.

When an oil and gas well is in operation, hydrocarbon fluids are produced. They are typically pumped to the surface for separation and treatment before they can be distributed to various terminals for transportation. Hydrocarbons are processed in a gas oil separation plant and the produced gases are further separated for enrichment to desired purity levels, or the gases are vented to the atmosphere. The gases that are usually vented to the atmosphere are methane ($CH_4$), $CO_2$, nitrogen ($N_2$), $H_2S$, and nitrous oxides.

In some implementations, gas wells are produced. Gas wells have high gas to oil (GOR) ratio, typically in the order of ten thousands at least. They produce natural gas streams which contain a mixture of gases that include $CH_4$, $CO_2$, $H_2S$ among others.

Wellhead Carbon Capture System

Figure 1A:
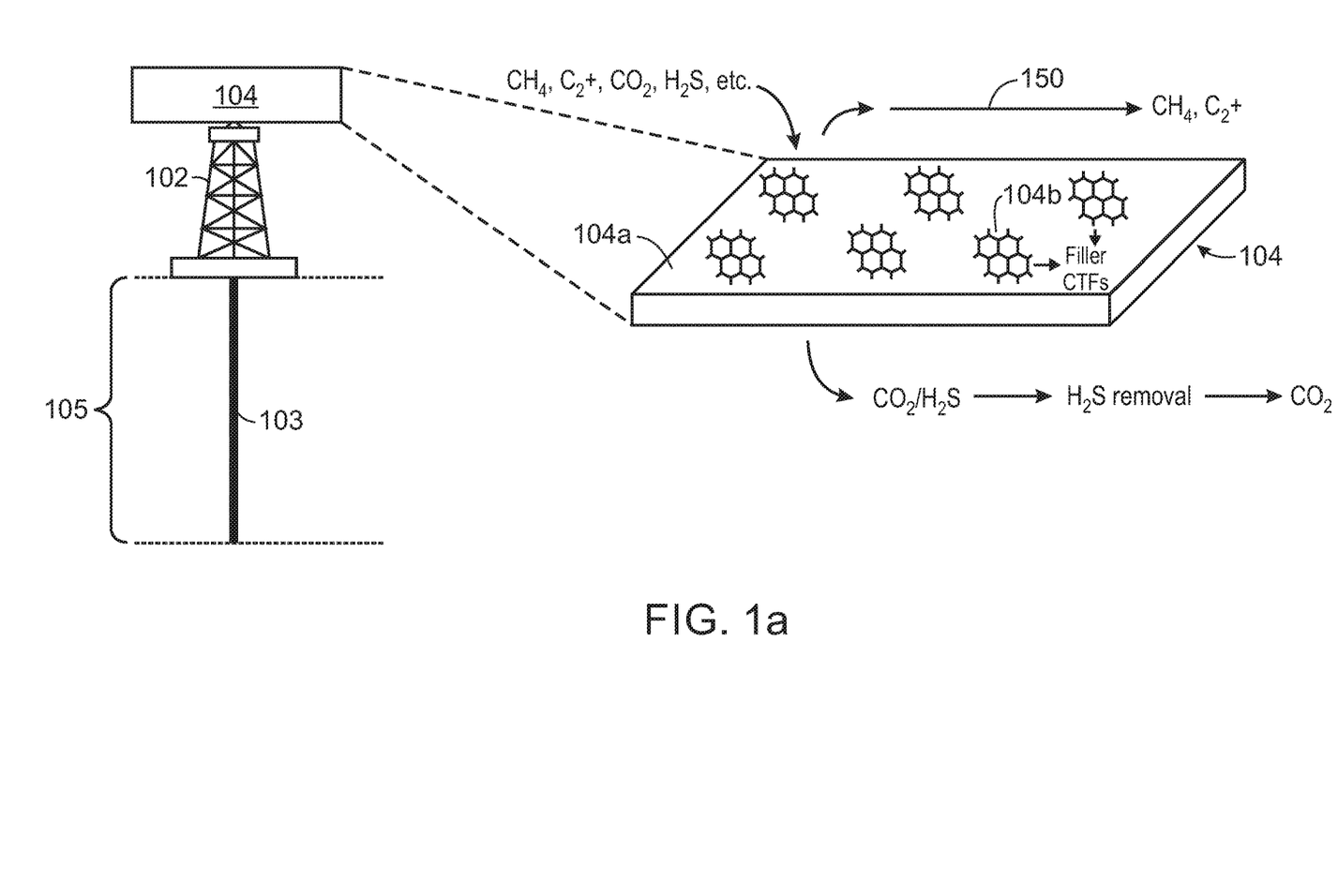
FIG. 1a is a schematic representation of a mixed matrix membrane installed at the wellhead.

FIG. 1a is a schematic drawing of a mixed matrix membrane (MMM) 104 installed at a wellhead 102. The wellhead 102 serves as a main interaction between the subsurface reservoir and the surface production facilities. The wellhead 102 is connected to a wellbore 103 that is formed in a subterranean zone 105. The subterranean zone 105 includes multiple geological formations or portion of geological formations. The formations can include, for example, saline aquifer zone, reservoir rocks, and rocks containing minerals among others. The reservoir rocks contain the hydrocarbons such as oil and gas that are typically produced through the wellhead 102. In some implementations these reservoir rocks contain a high amount of gas and very little oil. In this case the well is known as gas well. The wellhead 102 includes several valves and fittings that regulate the flow of gases and fluids. This arrangement is also known as the Christmas tree. They also provide access to the production tubing string. Accordingly, the hydrocarbons stored in the reservoir rocks or other areas of the subterranean zone 105 can be recovered via the wellbore 103 as a gas mixture including $CO_2$. The $CO_2$ may be originated from the subterranean zone 105 or the injection fluid used for oil and gas production.

As further illustrated in FIG. 1a, the MMM 104 includes a polymer matrix 104a and CTF fillers 104b. In various implementations, the polymer matrix includes polynorborenes and polytricyclononenes. The CTF fillers 104b are organic polymers that include aromatic 1,3,5-triazine rings as their core unit.

The CTF fillers 104b are selective for $CO_2$ as a permeate stream and rejects the other gases as reject gas stream 150. In some aspects, the MMM 104 can selectively let $CO_2$ and $H_2S$ gases to pass as permeate streams. In this case, the outlet gas stream from the MMM 104 undergoes further processing such as Claus process to remove elemental sulfur. Then the $CO_2$ can be separated from $H_2S$. In some implementation, the $H_2S$ content in the inlet gas stream to the MMM 104 is negligible and the MMM 104 creates a $CO_2$ rich permeate stream. In this case, no further $H_2S$ removal process may be required prior to subsequent $CO_2$ processing. The $CO_2$ rich stream passes through the valves at the wellhead 102 and it can used for various purposes as described below. They can include, for example, $CO_2$ storage in porous formations and injection as a gas phase for enhanced oil recovery processes. In some implementations, the $CO_2$ can be used as fluid phase for fracking.

Figure 1B:
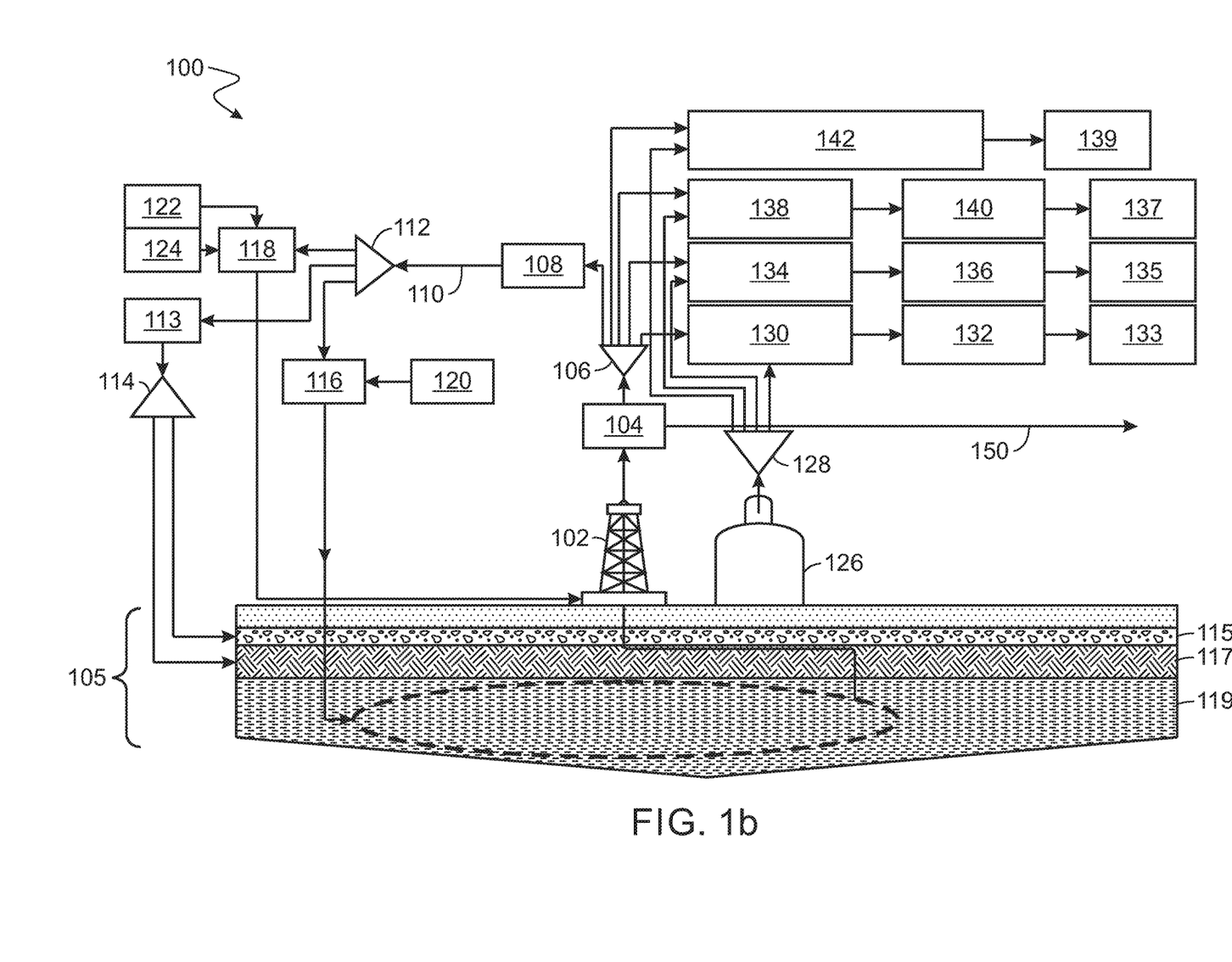
FIG. 1b is a drawing of a carbon capture, utilization, and storage system using mixed matrix membranes installed at the wellhead.

FIG. 1b is a drawing of a carbon capture, utilization, and storage system 100. The carbon dioxide ($CO_2$) captured from a wellhead 102 can be sequestered through direct injection into porous formations 115 under impermeable caps, into reactive rocks 117, or other formations/areas in the subterranean zone 105. Rocks rich in minerals, such as basalt, can react with $CO_2$ forming carbonates, effectively and permanently storing the reacted $CO_2$ underground.

In various implementations, the wellhead 102 serves as the main interaction between the subsurface reservoir section and the surface production section. In various implementations, a $CO_2$ separation system that includes a MMM 104 is installed at the wellhead 102 to selectively separate the high throughput of $CO_2$ gas during the production of natural gas. The MMM 104 selectively permeates $CO_2$ while rejecting other gases such as hydrocarbons and $N_2$. A rejected gas stream 150 can be sent for further processing. A first splitter 106 receives the captured $CO_2$ from the $CO_2$ separation unit. In an implementation, a splitter is at least a 2-way valve that includes a pressure regulator or a flow controller. In some implementations, the splitter may include multi-way valves to split a gas stream into multiple streams. Each outlet of the multi-way valve may include a pressure regulator or flow controller such that each individual stream's pressure or flow can be controlled. In some aspects, a common pressure regulator controls the gas stream's pressure. Each individual gas stream's pressure coming out of a splitter can be regulated further downstream as desired.

To reduce $CO_2$ emissions, $CO_2$ can be used for enhanced oil recovery by injecting it into the reservoir or it can be stored in the porous formations. The $CO_2$ gas injection also helps to lower oil viscosity, thereby increasing the relative permeability of oil during production as a secondary or tertiary process. Hence, it is a suitable choice for injection into the reservoir especially in tight porous medium such as shale. It can also be injected into other reservoir formations such as sandstones, carbonates, and mixed rocks.

The first splitter 106 sends the first split $CO_2$ stream to the $CO_2$ liquefier 108. A $CO_2$ liquefier 108 typically condenses gaseous $CO_2$ into a liquid form. The liquid $CO_2$ is then compressed and heated till it reaches a supercritical state. The liquefier includes raw gas compressors, heat exchangers, expansion turbines, liquid $CO_2$ tank, gas storage tank, vacuum insulated cold box, and control systems. The $CO_2$ liquefier 108 operates at high temperature and high pressure to form supercritical $CO_2$ 110. Typically, the critical temperature to convert gaseous $CO_2$ to supercritical $CO_2$ is greater than 31.1° C. and the critical pressure is greater or equal to 1070 psia. Supercritical $CO_2$ 110 has high diffusivity, low surface tension, and low viscosity which makes it a suitable choice for injection into a reservoir rock to recover additional oil.

Supercritical $CO_2$ 110 flows into a second splitter 112, that produces three split streams of supercritical $CO_2$. The first split stream of supercritical $CO_2$ flows into a $CO_2$ storage location 113 (stored as supercritical $CO_2$ or $CO_2$ based on pressure and temperature), from where it is processed via a third splitter 114. The third splitter 114 divides the $CO_2$ stream (supercritical $CO_2$ or $CO_2$) into multiple streams which are injected into the porous formation 115 or into reactive rocks 117.

Porous formations can include saline aquifers. Reactive rocks are rich in minerals, such as basalt. The minerals can react with carbon dioxide forming carbonates, effectively and permanently storing reacted $CO_2$. This technique may significantly reduce the risk of $CO_2$ escaping back to the atmosphere.

A second split supercritical $CO_2$ stream flows from the second splitter 112 into a first mixer 116. A mixer can include a large tank with impellers placed inside to bring a mixture to a uniform solution. The tank can include a control system to regulate the speed of mixing. A foaming agent 120, such as a surfactant is mixed with the second split supercritical $CO_2$ stream to be injected as an enhanced oil recovery (EOR) agent into an oil bearing reservoir zones 119 for a tertiary recovery process. The surfactant could be anionic, cationic, or zwitterionic which depends on the reservoir rock surface and its charge. In some implementations, the second split supercritical $CO_2$ stream is directly injected into the reservoir as a miscible process due to its property of high diffusivity, low viscosity, low surface tension. This helps to recover oil from the reservoir rock in a secondary or tertiary recovery process.

A third split supercritical $CO_2$ from the second splitter 112 is received by a mixer 118. The mixer 118 also receives a proppant supply 122 and a thickening agent 124 to form a fracturing fluid which is injected into the reservoir. Supercritical $CO_2$ can be used as a substitute for water in fracturing fluids as it reduces environmental impacts of polluting water, enhances fracturing, and helps sequester the gas in the targeted area. The thickening agents used in fracturing fluids can include surfactants, polymeric materials, $CO_2$-philic and $CO_2$-phobic groups, co-solvents etc. Proppants can include ceramic materials, resin-coated sand etc.

$CO_2$ Conversion

In various implementations, at least a portion of the captured $CO_2$ is chemically converted into valuable products. In some implementations, the split $CO_2$ stream from the first splitter 106 reacts with a split hydrogen stream, which is obtained via a fourth splitter 128. The fourth splitter 128 is connected to a hydrogen storage tank 126. The fourth splitter 128 splits the hydrogen gas stream into multiple streams to be used for various chemicals production or reaction intermediate formation.

The first split $CO_2$ stream, from the splitter 106 downstream of the MMM 104, reacts with the first split hydrogen stream from the fourth splitter 128 to produce methane gas in a reactor vessel 130. The formation of methane proceeds via the reaction:

$$CO_2+4H_2 \rightarrow CH_4+2H_2O.$$

The final products are received by a flash separator 132 to remove water and enrich the methane 133. The economic viability of this approach depends on the source of hydrogen and type of catalyst.

A second split $CO_2$ stream, from the splitter 106 downstream of the MMM 104, reacts with the second split hydrogen stream from the splitter 128 to produce methanol in a reactor vessel 134. The formation of methanol is obtained by the hydrogenation of carbon dioxide. It proceeds via the reaction:

$$CO_2+3H_2 \rightarrow CH_3OH+H_2O.$$

The molar ratio of $H_2$ to $CO_2$ is maintained at 3, to suppress side reactions. This reaction is conducted over a copper based catalyst. The catalyst may include copper, zinc oxide (ZnO), alumina, magnesia, copper oxide (CuO), or aluminum oxide ($Al_2O_3$), or mixtures thereof. In certain implementations, the catalyst is a mixture of copper and zinc oxides, supported on alumina. For instance, the catalyst is Cu—ZnO—$Al_2O_3$, sometimes modified with ingredients contributing to the increase of the copper dispersion and stability. Other catalysts are applicable. The reactor vessel may be a fixed-bed reactor having the catalyst in a fixed bed. The produced methanol is further purified using a distillation column 136, that yields the desired purity of methanol 135. Methanol has a wide variety of applications such as a fuel and or a reaction intermediate. It can be easily transported.

A third split $CO_2$ stream, from the splitter 106 downstream of the MMM 104, reacts with a third split hydrogen stream from the splitter 128 to produce carbon monoxide in dry reformer vessel 138. This follows the reaction:

$$CO_2+H_2 \rightarrow CO+H_2O.$$

The products are separated using a flash separator 140, to produce carbon monoxide 137 with negligible water content. Carbon monoxide is an essential component of syngas, which is used commercially to produce several chemicals.

A fourth split $CO_2$ stream, from the splitter 106 downstream of the MMM 104, reacts with a fourth split hydrogen stream from the splitter 128 to produce formic acid 139 in a reaction vessel 142. It proceeds via the reaction:

$$CO_2+2H^++2e^- \rightarrow HCOOH.$$

Formic acid may be used as a corrosion inhibitor in acid stimulation of carbonate reservoirs.

In addition to the previously mentioned reactions which are directly beneficial to the oil and gas industry, other reactions can be utilized for the purpose of storage or to sell $CO_2$ at a minimal cost. One approach is to convert $CO_2$ to graphite through a reaction with lithium aluminum hydride at relatively low temperatures. The reaction is as follows:

$$10LiAlH_4+9CO_2 \rightarrow 7C+6LiAlO_2+2Li_2CO_3+4Al+20H_2.$$

This is particularly promising because the produced graphite sub-micro flakes have a purity of 99.98%, saving in separation costs. The hydrogen byproduct could be separated and used in methanol production.

This system design aims to capture carbon dioxide at wellhead and utilize or store it to reduce the carbon footprint of oil and gas operations. In this system, the focus is on the significant amounts of $CO_2$ that are released through the wellhead. That includes $CO_2$ utilized in fracking, $CO_2$ injected for EOR, and naturally occurring $CO_2$. Some existing natural gas reservoirs comprise more than 50% $CO_2$, which can be a huge challenge for oil and gas production. Using highly selective advanced membranes to recapture any released $CO_2$ at wellhead and convert it into useful products is beneficial.

The above mentioned implementations to deal with captured $CO_2$ includes a comprehensive process for carbon capture and storage (CCUS), which can be tuned depending on operation and reservoir needs as well as the available resources and equipment. There is a wide variety of applications that can be utilized to prevent $CO_2$ emissions into the atmosphere. The captured $CO_2$ stream may be reutilized through sequestration and utilization approaches. The bulk stream may be split into multiple streams for various applications as shown FIG. 1b. Some $CO_2$ may be converted chemically to fuels, reaction intermediates, and productivity enhancement tools such as methanol, syngas, $CO_2$-foam, and stimulant acids. The rest may be stored through direct injection into porous formations or reactive rocks such as basalt.

Covalent Triazine Framework (CTF)-Based Mixed Membrane Matrix (MMM)

In various implementations, the polymer matrix of a CTF-MMM includes a polynorbornene or polytricyclononene, both of which can be synthesized from norbornene or its derivatives. Norbornene is a highly strained bridged cyclic hydrocarbon with a chemical formula of $C_7H_{10}$. Norbornene has a cyclohexene ring with a methylene bridge. Norbornene derivatives refers to any molecule with additional chemical structures attached to the cyclohexene ring of norbornene. These molecules can be used as monomers to prepare the polymer matrix. In various implementations, the norbornene derivatives are used as monomers to provide structural stability of the polymer, improvement of membrane performance, or both.

Depending on the synthetic approach used, the resulting polymer can be either polynorbornene via vinyl addition polymerization or polytricyclononene via ring-opening metathesis polymerization (ROMP). In various implementations, not only the structure of the main chain but also the nature and number of substituents in the monomer unit, substituted norbornene unit, have a significant effect on the properties of the resulting polymer, in particular on gas permeability. In some implementations, the polymer matrix includes a polytricyclononene with an alkoxysilane group. In some implementations, the polymer matrix for the CTF-MMM include a copolymer made from more than one monomer type. For example, more than one norbornene derivative can be used as monomers, or one norbornene derivative can be used with a non-norbornene comonomer.

In some implementations, a norbornene derivative having an imide group, e.g., norbornene nadimide, is used as monomers. The resulting substituted polynorbornene can be a nadimide derivative of polynorbornene. For example, dicyclopentadiene and maleic anhydride can be used as starting materials. The dicyclopentadiene can be depolymerized upon heating into cyclopentadiene, which can then react with the maleic anhydride with the formation of nadic anhydride. The nadic anhydride can subsequently react with a primary amine derivative with the chemical formula R—$NH_2$, where R can be, for example, an alkyl, aryl, cycloalkyl, alkylsilyl, alkoxy, aryloxy, alkoxysilyl or fluoroorganic group. As a result, norbornene nadimide derivative can be obtained. the norbornene nadimide derivative can be polymerized via vinyl addition polymerization.

In other implementations, a norbornene derivative having an amine group, e.g., tertiary amine group, can be used as monomers. For example, the norbornene derivative can be synthesized starting with 5-vinyl-2-norbornene. First, the 5-vinyl-2-norbornene can be polymerized via vinyl addition polymerization, for example, using a three-component catalyst system. In an implementation, the catalyst system includes N-heterocyclic carbene Pd-complex activated with sodium tetrakis(3,5-bis(trifluoromethyl)phenyl)borate (Na-BARF), $Na^+[B(3,5-(CF_3)_2C_6H_3)_4^-]$, in the presence of tricyclohexylphosphine ($PCy_3$). During this polymerization stage, only the endocyclic double bond of the cyclohexene ring can be involved in the polymerization, while the exocyclic double bond of the vinyl group can remain intact. At the second stage, the exocyclic vinyl group can be epoxidated in the presence of meta-chloroperoxybenzoic acid. At the final stage, the polymer with the epoxy groups reacts with an amine, e.g., a secondary amine $HNR_2$, where R can include, for example, an alkyl, aryl, cycloalkyl, alkoxy, aryloxy, perfluoroalkyl group, or any combination thereof. Accordingly, the resulting polymer can be a substituted polynorbornene with a tertiary amine group.

The use of substituted polynorbornene and the inclusion of an imide or amine group in the polymer for the polymer matrix can improve the affinity of the CTF-MMM to $CO_2$ and thereby its membrane performance.

Further, ring opening metathesis polymerization (ROMP) of norbornene derivatives can be applied to synthesize polytriclononenes, useful for the polymer matrix for a CTF-MMM. In some implementations, the polytriclononenes with an alkoxysilane group is synthesized as follows; the first stage of the synthesis is [2σ+2σ+2π]-cycloaddition of trichlorovinylsilane ($CH_2CHSiCl_3$) to quadricyclane to form tricyclononene-$SiCl_3$ ($TCNSiCl_3$); subsequently, the $TCNSiCl_3$ is reacted with an alcohol to form tricyclononene-$(OR)_3$ ($TCNSi(OR)_3$), where R can include but not limited to an alkyl, aryl, cycloalkyl, alkylsilyl, alkoxy, aryloxy, or perfluoroalkyl group; and the final polymerization stage is performed by ROMP of the $TCNSi(OR)_3$ with one or more Grubbs catalysts. In some implementations, the Grubbs catalysts include transition metal carbene complexes such as ruthenium (Ru). The cyclohexene ring of the $TCNSi(OR)_3$ is opened to form an unsaturated polytricyclopentylene vinylenes with double bonds in the main polymer chain.

The ROMP of norbornene without any substituted groups may result in a polynorbornene with poor stability, which in turn leads to a challenge in long-term gas separation performance. To address this issue, substituents can be introduced to the norbornene unit, e.g., trimethylsilyl or trialkoxysilane group. These substituents can increase the gas permeation properties and thermal stability of the polymer matrix and thereby the final CTF-MMM.

Covalent Triazine Frameworks (CTFs) for Porous Fillers

In general, synthetic methods for CTFs can be classified into two categories: (1) trimerization to form triazine units and (2) polymerization of triazine-based monomers. The first approach includes methods such as ionothermal synthesis, superacid synthesis, hard-template assisted synthesis, aromatic amide condensation, and microwave-assisted synthesis. The second approach includes methods based on the Schiff base reaction, Friedel-Crafts reaction, nucleophilic substitution reaction, coupling reaction, and amine dianhydride condensation.

In an implementation, CTFs are synthesized by the trimerization of 2,2',3,3',5,5',6,6'-octafluoro-4,4'-biphenyldicarbonitrile (F-DCBP). The trimerization can be performed, for example, under ionothermal conditions at 400° C. in the presence of $ZnCl_2$ as a molten Lewis acid catalyst. The ratio of the F-DCBP to $ZnCl_2$ can be varied between 5 and 10. During the polymerization via the trimerization, some defluorination can also occur, resulting in the fluorine content in the CTFs less than the theoretical amount based on the F-DCBP. In an implementation, the retention of the fluorine is about 10% of the theoretical amount. The fluorinated monomer, F-DCBP, can be synthesized from pentafluoro-benzonitrile in the presence of anhydrous diethyl ether as solvent and hexaethyl phosphorous triamide.

In another implementation, CTFs are synthesized by the trimerization of triazole-functionalized perfluorinated aromatic trinitrile (Tz-PFCN). The Tz-PFCN can be synthesized by the Cu(I)-catalyzed click reaction via reaction of 1,3,5-triethynylbenzene and 4-azidotetrafluorobenzonitrile. Similar to the previous implementation, the trimerization can be performed under ionothermal conditions, for example, in the presence of anhydrous $ZnCl_2$ with the molar ratio of the Tz-PFCN to $ZnCl_2$ about 10. The reaction temperature can be between 400° C. and 600° C.

In addition to trimerization, the polymerization of triazine-based monomers can be applied to synthesize CTFs. In an implementation, condensation of cyanuric chloride and 1,4-phenylenediamine, for example in an inert argon environment, can form CTFs with amine groups outside the triazine cores. Further functionalization of the CTFs can also be performed, for example, by reacting the CTFs with monoethanolamine at about 358.15 K for 3 days.

In various implementations, the CTFs are further modified after the polymerization stage to incorporate additional functional groups. Examples of the additional functional groups include amine-, silyl-, triazole units, fluorinated-biphenyl structure, and fluorinated moieties, which can further enhance the $CO_2$ affinity of the CTFs, improve the dispersion in polymeric matrix, or both.

After the synthesis of the polymer matrix and the CTFs as described above, a mixed membrane matrix (MMM) can be prepared by dispersing the CTFs in the polymer matrix. In various implementations, the preparation method generally includes steps of preparing a polymer solution and a filler solution, followed by adding the polymer solution into the filler solution and casting it to form a membrane film. The polymer, e.g., polynorbornene or polytriclononene, and CTFs can be dispersed in suitable solvents, e.g., toluene, chloroform, and dichromethane. Suitable solvents can be selected in view of the solubility, dispersibility, miscibility, and other factors. Two different solvent systems can be used for dissolving the polymer matrix and for dispersing the CTFs. Alternatively, the same solvent system can be used for both. The polymer solution can then be filtered through a 0.2 or 0.45-μm pore size filter for microfiltration. The filler solution containing the CTFs can be sonicated for about one to several hours for dispersion. The polymer solution can then be slowly added, e.g., dropwise, to the dispersion of CTFs under vigorous stirring and sonication to yield a casting solution. In some implementations, the filler to polymer ratio is between about 0.01 wt. % and about 30 wt. %. The casting solution can be poured to a membrane support and slowly dried to result a solid membrane film. In an implementation, solvent exchange is optionally performed using a boiling point solvent, e.g., methanol, which helps releasing the pores of the CTFs. The solid membrane film can then be dried in vacuum at an elevated temperature to remove the residual solvent, forming a final CTF-MMM.

In some implementations, a mixture of more than one polymer materials is used for the polymer matrix, where at least one component includes polynorbornene or polytricyclononene. Further, the porous fillers can be prepared using more than one CTFs, or include other porous materials, e.g., inorganic materials, in addition to the CTFs.

Figure 2:
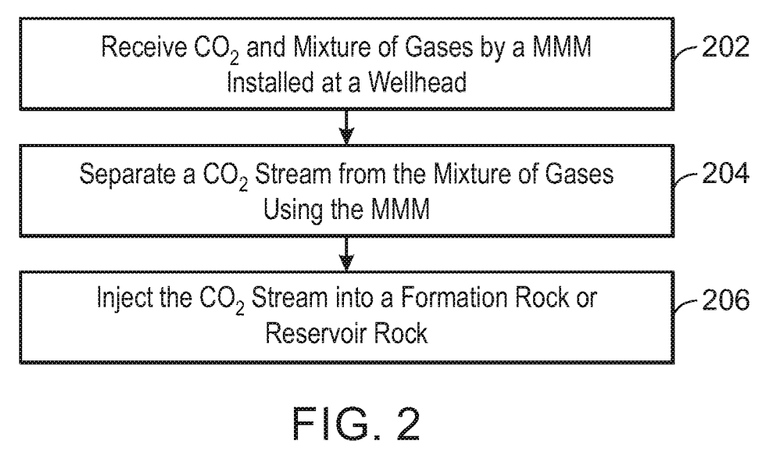
FIG. 2 is a process flow diagram of the $CO_2$ utilization for upstream reservoir usage.

FIG. 2 is a process flow diagram of $CO_2$ utilization by storage in the formation rock or enhanced oil recovery processes.

At block 202, a mixed matrix membrane (MMM) installed at the wellhead receives $CO_2$ and a mixture of hydrocarbons. At block 204, a $CO_2$ stream is separated by the MMM installed at the wellhead. The MMM is made up of a polymer matrix and a plurality of covalent triazine fillers. The polymer matrix includes polynorbornenes or polytricyclononenes. The MMM is selectively permeable to $CO_2$ relative to other gas mixtures. It forms a $CO_2$ stream as a permeate stream and rejects the other gases, which are sent downstream for further processing. In some implementations the MMM is selective to both $CO_2$ and $H_2S$ gas streams. If the permeate gas has a $H_2S$ percentage greater than 10-15%, a traditional process such as Claus process is used to remove the sulfur from the gas streams. The treated gas stream then includes a $CO_2$ rich stream. At block 206, the $CO_2$ rich stream is utilized for multiple purposes. One of them is to store the $CO_2$ in the geological formation in the form of gaseous $CO_2$ or supercritical $CO_2$ depending on the temperature and pressure.

In some implementations, the $CO_2$ stream is received by a splitter, which splits it into multiple streams. A high pressure liquefier is used to produce supercritical $CO_2$ from one of the split $CO_2$ streams and the supercritical $CO_2$ passes into a second splitter, where several split supercritical $CO_2$ streams are formed. The multiple split supercritical streams are either stored in geological formation such as a porous formation, reservoir rock, or injected into reactive rocks such as basalt for $CO_2$ mineralization. The minerals can react with carbon dioxide forming carbonates, effectively and permanently storing reacted $CO_2$. This technique may significantly reduce the risk of $CO_2$ escaping back to the atmosphere.

In some implementations, one of the split supercritical $CO_2$ streams is used for enhanced oil recovery (EOR) process as a miscible process or with a foaming agent such as a surfactant. In other implementations, one of the split $CO_2$ streams is used as a fracturing fluid along with a proppant and thickening agent.

Figure 3:
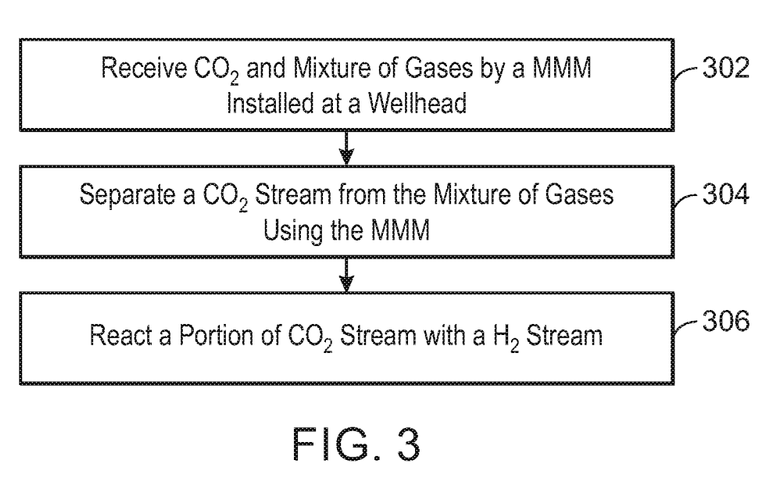
FIG. 3 is a process flow diagram of the $CO_2$ utilization for the production of various chemicals.

FIG. 3 is a process flow diagram of $CO_2$ utilization for chemical production.

At block 302, a MMM installed at the wellhead receives $CO_2$ and a mixture of hydrocarbons. At block 304, a $CO_2$ stream is separated by the MMM. The MMM is selectively permeable to $CO_2$ relative to other gas mixtures. It forms a $CO_2$ rich stream as a permeate stream and rejects the other gases, which are sent downstream for further processing. The MMM is made up of a polymer matrix and a plurality of covalent triazine fillers. The polymer matrix includes polynorbornenes or polytricyclononenes. At block 306, a portion of the $CO_2$ stream is reacted with a hydrogen stream to form useful chemicals. In some implementations, the $CO_2$ stream is received by a splitter and is split into multiple $CO_2$ streams. A hydrogen stream is obtained from renewable source or other sources such as electrolysis. In some implementations, the hydrogen stream is split into multiple streams such that each split hydrogen stream reacts with a split $CO_2$ stream.

In some implementations, the first split stream of $CO_2$ reacts with the first split hydrogen stream in a reactor vessel to produce methane. This proceeds via reaction:

$$CO_2 + 4H_2 \rightarrow CH_4 + 2H_2O.$$

In another implementation, a second split $CO_2$ stream reacts with another split hydrogen stream to produce methanol in a reactor vessel. It proceeds via the reaction:

$$CO_2 + 3H_2 \rightarrow CH_3OH + H_2O.$$

The molar ratio of $H_2$ to $CO_2$ is maintained at 3, to suppress side reactions. In another implementation, a third split $CO_2$ stream reacts with another split hydrogen stream to produce carbon monoxide in a dry reformer vessel. This follows the reaction:

$$CO_2 + H_2 \rightarrow CO + H_2O.$$

A fourth split $CO_2$ stream reacts with another split hydrogen stream to produce formic acid in a reaction vessel. It proceeds via the reaction:

$$CO_2 + 2H^+ + 2e^- \rightarrow HCOOH.$$

Implementations

An implementation described herein provides a system for $CO_2$ separation that includes a mixed matrix membrane (MMM) installed at a wellhead of a wellbore. The wellbore is formed in a subterranean zone. The MMM receives a gas stream that includes $CO_2$ and a mixture of hydrocarbons through the wellbore. The gases are formed in the subterranean zone. The MMM separates $CO_2$ from the mixture of hydrocarbons. The MMM is made up of a polymer matrix and covalent triazine framework (CTF) fillers. A splitter, that is installed downstream of the $CO_2$ separation system splits the separated $CO_2$ into a plurality of $CO_2$ streams.

In an aspect, combinable with any other aspect, the polymer matrix includes polynorbornenes or polytricyclononenes.

In an aspect, the polymer matrix includes an imide group or amine group.

In an aspect, the polymer matrix includes a polynorborene with a norbornene nadimide structure, a polynorbornene including an amine group, or a polytricyclenonene including an alkoxysilane group.

In an aspect, combinable with any other aspect, the CTF filler includes fluorine, fluorinated-biphenyl structure, or triazole unit.

In an aspect, combinable with any other aspect, the MMM selectively captures $CO_2$ to produce a $CO_2$ rich permeate stream.

In an aspect, combinable with any other aspect, the system further includes a liquefier installed downstream of the splitter, where the liquefier is configured to receive one of the plurality of $CO_2$ stream from the splitter to produce a supercritical $CO_2$ stream.

In an aspect, the splitter is a first splitter, and the system further includes a second splitter to receive the supercritical $CO_2$ stream from the liquefier and split the supercritical $CO_2$ stream into a plurality of supercritical $CO_2$ streams.

An implementation described herein provides a method for $CO_2$ separation and utilization. The method includes receiving $CO_2$ and a mixture of hydrocarbons gas stream by a MMM installed at the wellhead of a wellbore. The wellbore is formed in a subterranean zone. The MMM includes a polymer matrix and covalent triazine framework fillers. The $CO_2$ is separated from the mixture of hydrocarbons using the MMM and it is injected into the subterranean zone.

In an aspect, combinable with any other aspect, the method further includes, after separating, splitting the separated $CO_2$ stream into a plurality of split $CO_2$ streams using a first splitter.

In an aspect, the method further includes producing a supercritical $CO_2$ stream from a first split $CO_2$ stream from the plurality of split $CO_2$ streams using a liquefier.

In an aspect, the method further includes producing a plurality of split supercritical $CO_2$ streams from the supercritical $CO_2$ using a second splitter.

In an aspect, the method further includes: storing one of the plurality of split supercritical $CO_2$ streams in a reservoir rock; injecting one of the plurality of split supercritical $CO_2$ streams as an enhanced oil recovery fluid along with a foaming agent into a reservoir rock; or pumping one of the plurality of split supercritical $CO_2$ streams as a fracturing fluid to the wellhead along with a thickening agent and a proppant.

In an aspect, combinable with any other aspect, the polymer matrix comprises polynorbornenes or polytricyclononenes.

An implementation described herein provides a method for $CO_2$ separation and utilization. The method includes receiving $CO_2$ and a mixture of hydrocarbons gas stream by a MMM installed at the wellhead of a wellbore. The wellbore is formed in a subterranean zone. The MMM includes a polymer matrix and covalent triazine framework fillers. The polymer matrix includes polynorbornenes or polytricyclononenes. The $CO_2$ is separated from the mixture of hydrocarbons using the MMM and a portion of the separated $CO_2$ stream is reacted with a hydrogen stream.

In an aspect, combinable with any other aspect, the method further includes, prior to the reacting, splitting the separated $CO_2$ stream into a plurality of split $CO_2$ streams using a first splitter, one of the plurality of split $CO_2$ streams being the portion reacting with the hydrogen stream.

In an aspect, combinable with any other aspect, the reacting includes producing methane, methanol, carbon monoxide, formic acid.

In an aspect, combinable with any other aspect, the polymer matrix includes a polynorborene with a norbornene nadimide structure, a polynorbornene including an amine group, or a polytricyclenonene including an alkoxysilane group.

In an aspect, combinable with any other aspect, the covalent triazine frameworks (CTF) filler includes fluorine, fluorinated-biphenyl structure, or triazole unit.

In an aspect, combinable with any other aspect, the method further includes: producing a supercritical $CO_2$ stream from another portion of the separated $CO_2$ stream; and injecting the supercritical $CO_2$ stream into a formation.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A carbon dioxide ($CO_2$) separation system, comprising:
a mixed matrix membrane (MMM) installed at a wellhead of a wellbore formed in a subterranean zone, the MMM configured to receive a gas stream comprising $CO_2$ and a mixture of hydrocarbons through the wellbore, the gas stream being produced in the subterranean zone, wherein the MMM separates the $CO_2$ from the mixture of hydrocarbons, wherein the MMM comprises a polymer matrix and a covalent triazine frameworks (CTF) filler; and a splitter installed downstream of the $CO_2$ separation system to split the separated $CO_2$ into a plurality of $CO_2$ streams.

2. The system of claim 1, wherein the polymer matrix comprises polynorbornenes or polytricyclononenes.

3. The system of claim 2, wherein the polymer matrix comprises an imide group or amine group.

4. The system of claim 2, wherein the polymer matrix comprises a polynorborene with a norbornene nadimide structure, a polynorbornene comprising an amine group, or a polytricyclenonene comprising an alkoxysilane group.

5. The system of claim 1, wherein the covalent triazine frameworks (CTF) filler comprises fluorine, fluorinated-biphenyl structure, or triazole unit.

6. The system of claim 1, wherein the MMM selectively captures $CO_2$ to produce a $CO_2$ rich permeate stream.

7. The system of claim 1, further comprising a liquefier installed downstream of the splitter, the liquefier configured to receive one of the plurality of $CO_2$ streams from the splitter to produce a supercritical $CO_2$ stream.

8. The system of claim 7, wherein the splitter is a first splitter, the system further comprising a second splitter to receive the supercritical $CO_2$ stream from the liquefier and split the supercritical $CO_2$ stream into a plurality of supercritical $CO_2$ streams.

9. A method of carbon dioxide ($CO_2$) separation and utilization, the method comprising:
receiving a gas stream comprising $CO_2$ and a mixture of hydrocarbons streams by a mixed matrix membrane (MMM) at a wellhead of a wellbore formed in a subterranean zone, the MMM comprising a polymer matrix and a covalent triazine frameworks (CTF) filler;
separating a $CO_2$ stream from the mixture of hydrocarbons using the MMM; and
injecting the $CO_2$ stream into the subterranean zone.

10. The method of claim 9, further comprising, after separating, splitting the separated $CO_2$ stream into a plurality of split $CO_2$ streams using a first splitter.

11. The method of claim 10, further comprising producing a supercritical $CO_2$ stream from a first split $CO_2$ stream from the plurality of split $CO_2$ streams using a liquefier.

12. The method of claim 11, further comprising producing a plurality of split supercritical $CO_2$ streams from the supercritical $CO_2$ using a second splitter.

13. The method of claim 12, further comprising:
storing one of the plurality of split supercritical $CO_2$ streams in a reservoir rock;
injecting one of the plurality of split supercritical $CO_2$ streams as an enhanced oil recovery fluid along with a foaming agent into a reservoir rock; or
pumping one of the plurality of split supercritical $CO_2$ streams as a fracturing fluid to the wellhead along with a thickening agent and a proppant.

14. The method of claim 9, wherein the polymer matrix comprises polynorbornenes or polytricyclononenes.

15. A method of carbon dioxide ($CO_2$) separation and utilization, the method comprising:
receiving a gas stream comprising $CO_2$ and a mixture of hydrocarbons streams by a mixed matrix membrane (MMM) installed at a wellhead of a wellbore formed in a subterranean zone, the MMM comprising a polymer matrix and a covalent triazine frameworks (CTF) filler, the polymer matrix comprising polynorbornenes or polytricyclononenes;
separating a $CO_2$ stream from the mixture of hydrocarbons using the MMM; and reacting a portion of the separated $CO_2$ stream with a hydrogen stream.

16. The method of claim 15, further comprising, prior to the reacting, splitting the separated $CO_2$ stream into a plurality of split $CO_2$ streams using a first splitter, one of the plurality of split $CO_2$ streams being the portion reacting with the hydrogen stream.

17. The method of claim 15, wherein the reacting comprises producing methane, methanol, carbon monoxide, or formic acid.

18. The method of claim 15, wherein the polymer matrix comprises a polynorborene with a norbornene nadimide structure, a polynorbornene comprising an amine group, or a polytricyclenonene comprising an alkoxysilane group.

19. The method of claim 15, wherein the covalent triazine frameworks (CTF) filler comprises fluorine, fluorinated-biphenyl structure, or triazole unit.

20. The method of claim 15, further comprising:
producing a supercritical $CO_2$ stream from another portion of the separated $CO_2$ stream; and
injecting the supercritical $CO_2$ stream into a formation.

* * * * *

UNITED STATES PATENT AND TRADEMARK OFFICE
CERTIFICATE OF CORRECTION

PATENT NO. : 12,121,851 B1  
APPLICATION NO. : 18/638509  
DATED : October 22, 2024  
INVENTOR(S) : Ghassan Salem AlShehry et al.

Page 1 of 1

It is certified that error appears in the above-identified patent and that said Letters Patent is hereby corrected as shown below:

In the Claims

In Column 12, Line 9, Claim 4, please replace "polynorborene" with -- polynorbornene --

In Column 12, Line 11, Claim 4, please replace "polytricyclenonene" with -- polytriclononene --

In Column 13, Line 12, Claim 18, please replace "polynorborene" with -- polynorbornene --

In Column 13, Line 14, Claim 18, please replace "polytricyclenonene" with -- polytriclononene --

Signed and Sealed this  
Seventeenth Day of December, 2024

Derrick Brent  
*Acting Director of the United States Patent and Trademark Office*